United States Patent [19]

Schierbeek et al.

[11] Patent Number: 4,956,591

[45] Date of Patent: Sep. 11, 1990

[54] CONTROL FOR A MOISTURE SENSOR

[75] Inventors: Kenneth L. Schierbeek, Zeeland; Mark L. Larson, Grand Haven; Kenneth Schofield, Holland, all of Mich.

[73] Assignee: Donnelly Corporation, Holland, Mich.

[21] Appl. No.: 377,589

[22] Filed: Jul. 10, 1989

Related U.S. Application Data

[63] Continuation-in-part of Ser. No. 317,288, Feb. 28, 1989.

[51] Int. Cl.$^5$ .............................................. B60S 1/08
[52] U.S. Cl. ................................... 318/483; 318/444; 318/DIG. 2
[58] Field of Search ............... 318/443, 444, 480, 483, 318/DIG. 2; 15/250 C, 250.17

[56] References Cited

U.S. PATENT DOCUMENTS

| | | | |
|---|---|---|---|
| 2,108,202 | 2/1938 | Kelly, Jr. | 250/27 |
| 3,197,699 | 7/1965 | Johansen | 324/65 |
| 3,555,289 | 1/1971 | Sobkow | 307/10 |
| 3,643,145 | 2/1972 | Tann et al. | 318/443 |
| 3,649,898 | 3/1972 | Inoue | 318/483 |

(List continued on next page.)

FOREIGN PATENT DOCUMENTS

| | | |
|---|---|---|
| 0175362 | 3/1986 | European Pat. Off. . |
| 2101319 | 7/1972 | Fed. Rep. of Germany . |
| 2255264 | 5/1974 | Fed. Rep. of Germany . |
| 2345546 | 3/1975 | Fed. Rep. of Germany . |
| 2361579 | 6/1975 | Fed. Rep. of Germany . |
| 3001546 | 9/1981 | Fed. Rep. of Germany . |
| 3244767 | 6/1984 | Fed. Rep. of Germany . |
| 54-110529 | 8/1979 | Japan . |
| 58-118436 | 7/1983 | Japan . |
| 58-199253 | 11/1983 | Japan . |
| 59-14563 | 1/1984 | Japan . |
| 59-100034 | 6/1984 | Japan . |
| 59-106348 | 6/1984 | Japan . |
| 60-78844 | 5/1985 | Japan . |
| 60-174348 | 9/1985 | Japan . |
| 61-57842 | 3/1986 | Japan . |
| 1101441 | 1/1968 | United Kingdom . |
| 1150384 | 4/1969 | United Kingdom . |
| 1321221 | 6/1973 | United Kingdom . |
| 1382261 | 1/1975 | United Kingdom . |

OTHER PUBLICATIONS

Peter Hochstein Sketch & Circuit entitled "Bench Test W/ Solar Word Cells for Compensated Rain Sensor", dated prior to Applicants' conception.
3 pgs. from Sieman Opto Electronic Data Book—1986 showing various types of circuits.

Primary Examiner—Bentsu Ro
Attorney, Agent, or Firm—Price, Heneveld, Cooper, DeWitt & Litton

[57] ABSTRACT

A control for a moisture sensing assembly, adapted for mounting on the inner surface of a vehicle window or windshield to control vehicle accessories such as windshield wipers, maximizes the window area being sensed in relationship to the size of the assembly and provides immunity to interference from environmental influences. In the preferred embodiment, moisture on the outer window surface is detected by first and second moisture sensors each including infrared energy radiating diodes and radiant energy detectors which detect and process radiant energy to produce a moisture signal that is a function of the moisture on the window. A synchronizing circuit intermittently actuates the radiating diode for the two sensors individually and alternatingly at equally-spaced intervals. The synchronizing circuit also inhibits the radiant energy detectors from processing the radiant energy signal except when the corresponding radiating diodes are emitting energy in order to prevent interference from the other radiating diodes and environmental influences. The synchronizing circuit includes a pair of oscillators which include capacitors and coupling devices that coordinate the discharging of the capacitors in a manner which provides equal intervals between alternating output pulses from the oscillators.

35 Claims, 5 Drawing Sheets

U.S. PATENT DOCUMENTS

| | | | |
|---|---|---|---|
| 3,743,056 | 7/1973 | Zitelli et al. | 187/29 |
| 3,786,330 | 1/1974 | Inoue et al. | 318/483 |
| 3,794,847 | 2/1974 | Cadiou | 307/117 |
| 3,826,979 | 7/1974 | Steinmann | 324/61 |
| 3,882,381 | 5/1975 | Gregory | 324/61 |
| 4,010,383 | 3/1977 | Grassmann | 307/118 |
| 4,131,834 | 12/1978 | Blaszkowski | 318/DIG. 2 X |
| 4,160,175 | 7/1979 | Trout | 307/358 |
| 4,317,073 | 2/1982 | Blaszkowski | 318/480 X |
| 4,339,698 | 7/1982 | Kearns | 318/444 |
| 4,355,271 | 10/1982 | Noack | 318/480 |
| 4,463,294 | 7/1984 | Gibson | 318/313 |
| 4,476,419 | 10/1984 | Fukatsu et al. | 318/480 X |
| 4,481,450 | 11/1984 | Watanabe et al. | 318/480 X |
| 4,495,452 | 1/1985 | Boegh-Peterson | 318/444 |
| 4,499,410 | 2/1985 | Iacoponi | 318/444 |
| 4,527,105 | 7/1985 | Shiraishi | 318/444 |
| 4,542,325 | 9/1985 | Kobayashi et al. | 318/483 |
| 4,554,493 | 11/1985 | Armstrong | 318/444 |
| 4,567,412 | 1/1986 | Graham | 318/483 |
| 4,595,866 | 6/1986 | Fukatsu et al. | 318/480 X |
| 4,613,802 | 9/1986 | Kraus et al. | 318/483 |
| 4,620,141 | 10/1986 | McCumber et al. | 318/483 |
| 4,636,643 | 1/1987 | Nakamura et al. | 250/338 |
| 4,636,698 | 1/1987 | Leclercq | 318/480 X |
| 4,689,536 | 8/1987 | Iyoda | 318/483 |
| 4,703,237 | 10/1987 | Hochstein | 318/483 |
| 4,710,878 | 12/1987 | Iyoda | 364/424 |
| 4,740,735 | 4/1988 | Hayashi | 318/483 |
| 4,798,956 | 1/1989 | Hochstein | 250/341 |
| 4,859,867 | 8/1989 | Larson et al. | 307/10.1 |

CONTROL FOR A MOISTURE SENSOR

CROSS-REFERENCE TO RELATED APPLICATIONS

This application is a continuation-in-part of copending application Ser. No. 07/317,288, filed Feb. 28, 1989 entitled CONTINUOUSLY ADAPTIVE MOISTURE SENSOR SYSTEM FOR WIPER CONTROL.

BACKGROUND OF THE INVENTION

This invention relates to moisture sensors for detecting moisture such as rainfall and dew as well as other matter such as dirt, dust, salt film and the like on windows. The invention is especially adapted for vehicle windows to control accessories such as windshield wipers and the like. More particularly, the invention concerns a control for a moisture sensing apparatus mounted on one side of a window panel for detecting moisture and other matter on the opposite side of the window panel while maximizing the area sensed and minimizing the overall assembly size.

Various types of moisture sensing apparatus have been used on vehicles to control accessories such as windshield wipers. Optical moisture sensors have been found particularly useful since they require no special coatings or other structure on the exterior of the window or vehicle for physically contacting rainfall or moisture. One such device employs an infrared emitter and detector which senses infrared energy emitted from inside the windshield or window and refracted and reflected back at decreased levels when moisture or other matter is present on the outside of the windshield to a detector also mounted on the interior of the vehicle. Such a sensor is disclosed in U.S. Pat. No. 4,798,956 and includes an emitter which emits pulses of infrared energy toward the inside surface of a window at an incident angle. The radiant energy is refracted into the window at the inside air/window surface and reflected off the air/outside window surface back through the window where it is again refracted and detected by a detector/sensor positioned along a reflection angle equal to the incident angle. The emitter and detector are spaced and positioned at predetermined locations and angles all as set forth in U.S. Pat. No. 4,798,956.

An improved control for such moisture sensing device is disclosed in copending, commonly-assigned U.S. patent application Ser. No. 07/317,288, filed Feb. 28, 1989 by Kenneth L. Schierbeek, Mark L. Larson and Kenneth Schofield, entitled "CONTINUOUSLY ADAPTIVE MOISTURE SENSOR SYSTEM FOR WIPER CONTROL." That control is used with a moisture sensing device positioned on a portion of the windshield cleared by the wiper and provides an adaptive moisture sensor system. The disclosed control includes moisture sensing means responsive to the presence of moisture for producing a moisture signal, reference signal generating means for generating a reference signal and comparison means for producing an output to the vehicle wiper system that indicates the relationship of the moisture signal to the reference signal. In this control, the reference generating means is responsive to the moisture signal for continuously adapting the reference signal toward the moisture signal to cause the control to adapt to changes in the system as a result of component aging, mounting tolerances and the like. During rain conditions, the reference generating means adapts the reference signal to the moisture signal at a faster rate in response to decreasing sensed moisture than in response to increasing sensed moisture such that the control adapts to the driest sensed condition of the windshield. The reference generating means additionally adapts the reference signal at a fast rate, to offset the reference signal and terminate dry wiping, when the moisture signal becomes stable due to a soiled windshield. The fast adapting functions are disabled during non-moisture conditions to reduce the tendency of such a control to adapt to rapidly changing environmental factors such as overhead street lights.

Use of the optical moisture sensing devices revealed that the area of the window being sensed was relatively small, and that the probability of moisture impinging on the sensed area was likewise small, especially in light rain conditions. Thus, in conditions where a relatively small and scattered number of raindrops strike the vehicle and its window areas, the probability of such a drop falling on the sensed area and being indicated to control the desired vehicle accessory (such as the windshield wipers) often prevented operation of the wipers until long after significant rain had begun to fall.

In the above referred to Schierbeek et al. application, a plurality of moisture sensing units are provided, each of which includes a moisture sensor, a reference generating circuit and a comparison means. These units are positioned at selected locations on the windshield within the area cleared by the wiper(s). A master control receives output signals from all of the moisture sensing units and responds to any sensing unit output indicating the presence of moisture by enabling the fast adapting function for each and every moisture sensing unit.

In order to obtain a reliable indication of a moisture condition, however, the desired number of such moisture sensing units occupies a large portion of the windshield. Therefore, a need was recognized for an improved moisture sensing device of the optical type which would maximize the window area being sensed while minimizing the size of the sensing assembly.

This need is addressed in copending, commonly-assigned U.S. patent application Ser. No. 377,942 filed on even date herewith by Desmond J. O'Farrell and Kenneth Schierbeek, entitled "VEHICLE MOISTURE SENSOR AND MOUNTING APPARATUS THEREFOR." This application discloses a moisture sensor providing an increased sensing area while minimizing the assembly size through the inclusion of two or more energy emitting diode arrays (emitters) and energy detecting photosensor arrays (detectors) arranged in a stacked relationship. Radiant energy barriers reduce the reflection of radiant energy from the first emitter and the inner surface of the windshield to the first and second detector and from the second emitter and the inner surface of the windshield to the first detector.

SUMMARY OF THE INVENTION

Accordingly, the present invention provides an improved control for a moisture sensing device of the type disclosed in the above referenced O'Farrell et al. application. Operation of the plurality of emitters and detectors is controlled in a manner that enhances the effect of the radiant energy barriers of the device to further reduce the effect on a detector of radiant energy emitted from a non-associated emitter. The invention also provides a reduction of the influence of extraneous environmental "noise" on the operation of an adaptive moisture sensor system and, accordingly, has application to such adaptive systems that do not utilize a plurality of stacked emitters and detectors.

These and other advantages are provided in a moisture sensing control for use with a window, such as a vehicle windshield, to detect and indicate the presence of moisture on a surface of the window. A first moisture sensing means is responsive to the presence of moisture on the window for producing a first moisture signal that is a function of the moisture. A second moisture sensing means is responsive to the presence of moisture on the window for producing a second moisture signal that is a function of the moisture and circuit means responds to the first and second moisture signals for producing an indication of moisture on the window. Inhibiting means are provided for inhibiting one of the moisture sensing means from responding to the presence of moisture on the window when the other moisture sensing means is responding in order to reduce the tendency of one sensing means to influence the moisture signal produced by the other sensing means.

Preferably each moisture sensing means includes an emitter means for emitting radiant energy and detecting means for detecting and processing radiant energy from the emitter means. Synchronizing means are provided for intermittently actuating the first and second emitter means, individually and alternatingly, at equally-spaced intervals. The inhibiting means may respond to the actuating means to inhibit each detecting means from responding to pulsed radiant energy, except during the period when its corresponding emitter means is being actuated. Thus, each detecting means is immune to first surface reflection of radiant energy emitted by the other emitter means. Because each emitter means typically emits radiant energy at a very low duty cycle, the inhibiting means inhibits the detecting means most of the time. When inhibited, the detecting means is essentially immune from influence by environmental factors, or noise. Therefore, the invention provides superior immunity to factors, such as ambient light, in addition to radiant energy emitted by the opposite emitter means. It is for this reason that the invention finds application not only in a system having a plurality of emitters and detectors but also in a single emitter/detector system.

Another aspect of the invention provides an improved synchronizing means for alternatingly actuating the first and second emitter means. The synchronizing means includes first and second oscillators, each having a capacitor, means for charging the capacitor, sensing means for sensing the charge on the capacitor and discharging means responsive to the sensing means for discharging the capacitor when the charge thereon increases to a predetermined level. Each oscillator further includes a coupling means which responds to its discharging means for partially discharging the capacitor of the other oscillator. This partial discharging keeps the charges of the capacitors balanced so that the intermittent outputs of the oscillators will be equally spaced apart.

These and other objects, advantages, purposes and features of the invention will become more apparent from a study of the following description taken in conjunction with the drawings

DESCRIPTION OF THE PREFERRED EMBODIMENT

Figure 1:
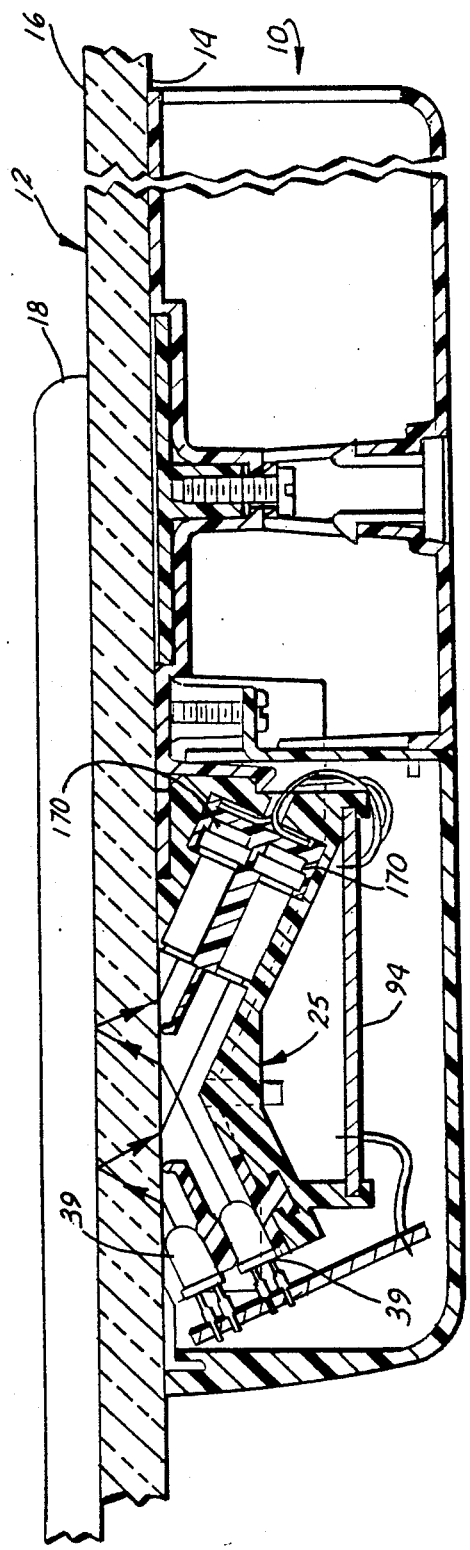
FIG. 1 is a sectional side elevation of a moisture sensing assembly embodying the present invention, secured to the inside surface of a conventional vehicle windshield behind the area cleared by the vehicle windshield wiper.

Referring now to the drawings in greater detail, a first embodiment 10 of the moisture sensing assembly for controlling vehicle accessories such as windshield wipers is illustrated in FIG. 1. Assembly 10 is adapted for mounting on the inside surface of a vehicle window 12 such as the front windshield for sensing the presence of moisture such as rainfall, dew and the like or other particles such as dust, dirt, salt residue or other matter on the exterior surface of the window. In the illustrated embodiment, window 12 is the front windshield of a vehicle with assembly 10 being mounted on inside surface 14 for sensing the presence of moisture and other matter on the exterior surface 16 This physical configuration is more fully described in commonly-assigned, copending application Ser. No. 377,942, filed on even date herewith by Desmond J. O'Farrell and Kenneth Schierbeek, entitled VEHICLE MOISTURE SENSOR AND MOUNTING MEANS THEREFOR, the disclosure of which is hereby incorporated herein by reference. Since the physical configuration of the moisture sensing assembly is fully described in said application, such description will not be included in detail herein. Suffice it to say that moisture sensing assembly 10 includes a moisture sensing unit 25 which is held and urged against the inside surface 14 of windshield 12. Sensing unit 25 includes a plurality of infrared energy emitting diodes 39 which emit and project infrared energy toward windshield glass 12 where the energy is refracted and reflected at the air/exterior glass interface back through the glass and into infrared energy sensing photovoltaic cells 170 which convert the detected energy into an electrical current or signal. That signal is conveyed to an electronic control system on a circuit board 94 attached to the sensing unit.

Figure 2:
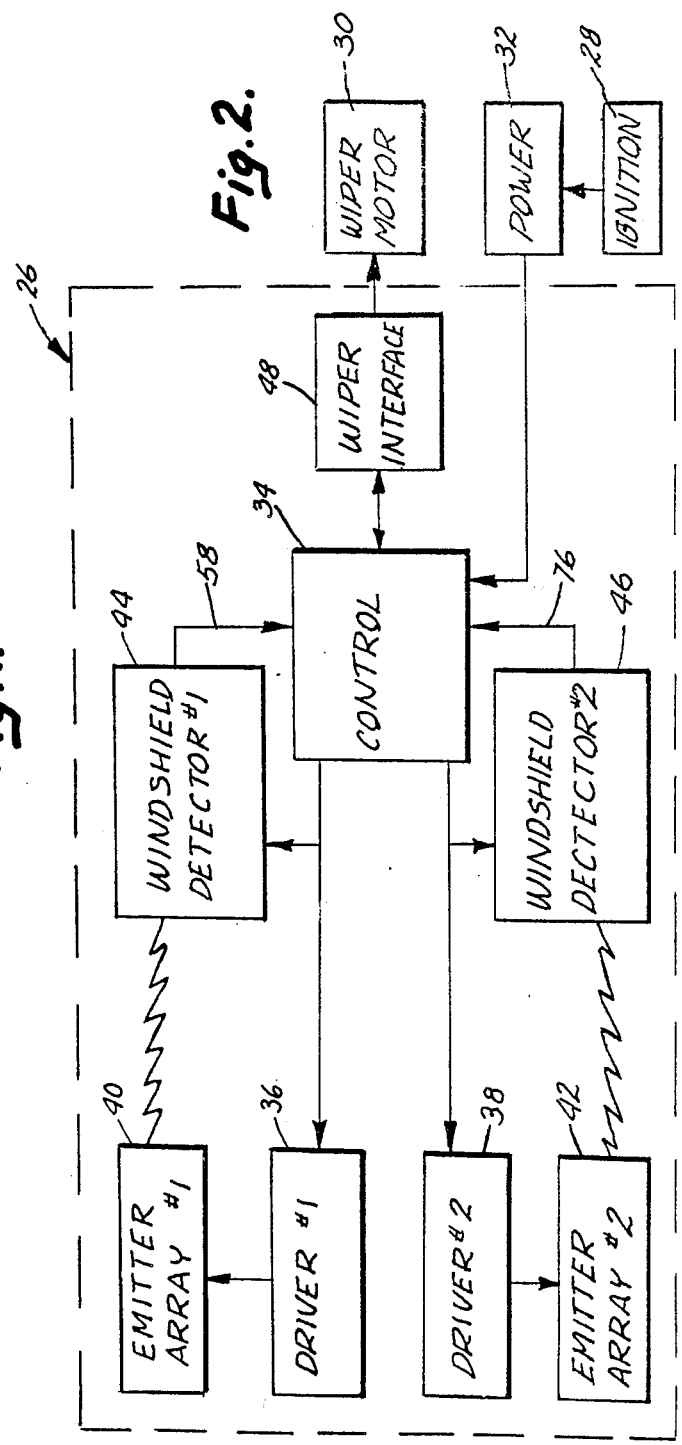
FIG. 2 is a block diagram of a moisture sensor control according to the invention and its connection to the vehicle electrical system and windshield wiper motor.
Figure 3:
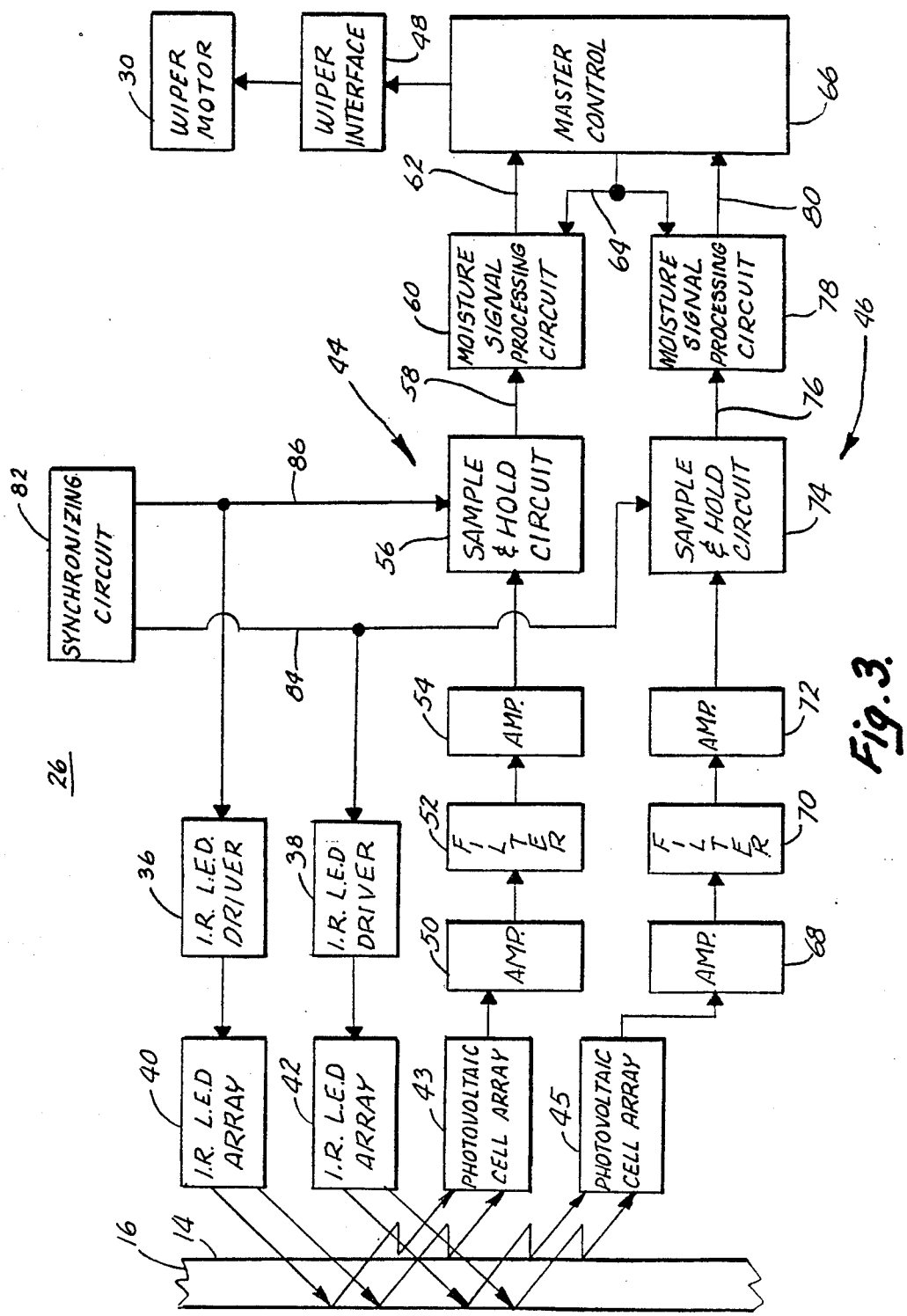
FIG. 3 is a block diagram of the moisture sensor control in FIG. 2 illustrating additional details thereof.
Figure 4:
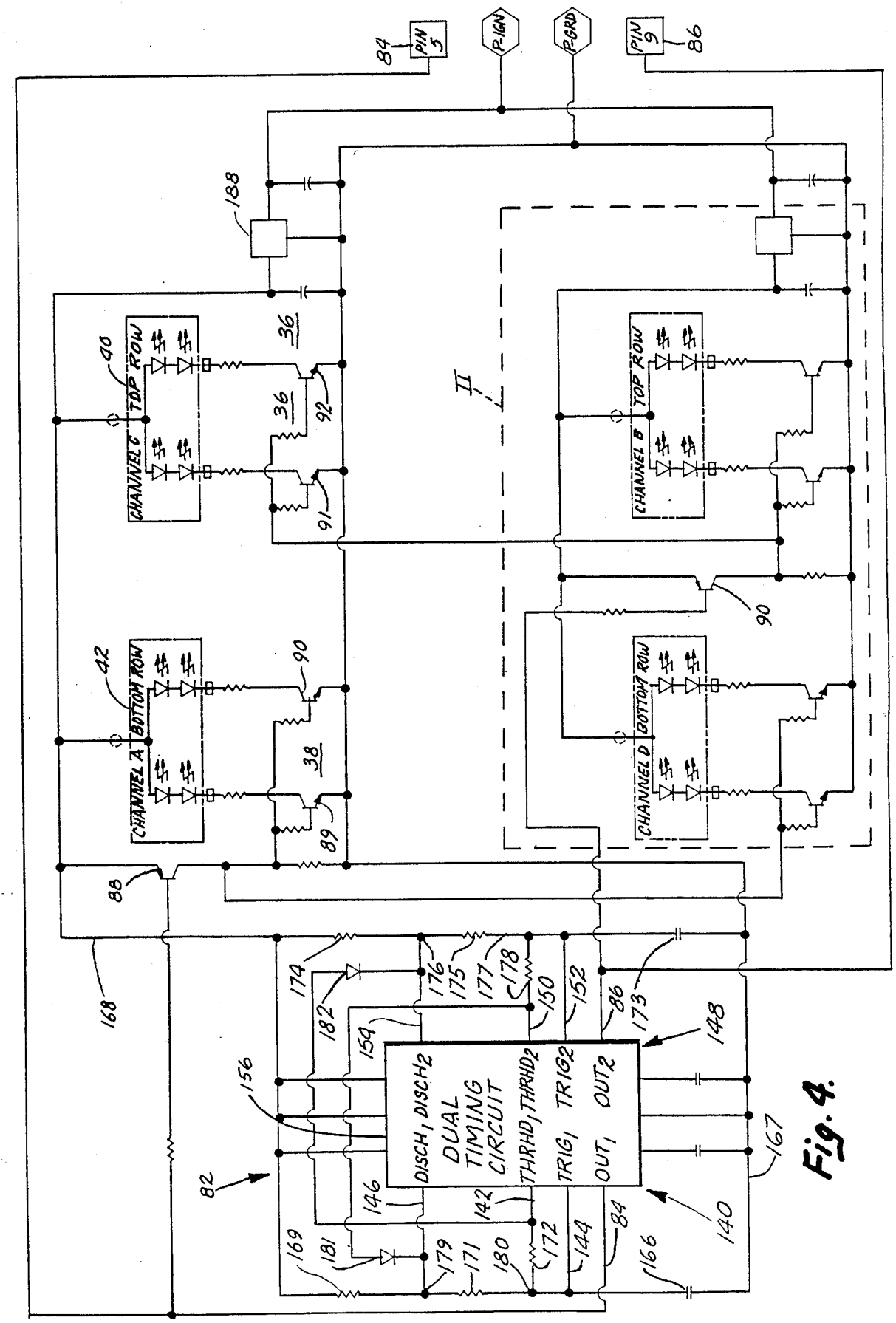
FIG. 4 is a schematic circuit diagram of the emitter portion of a moisture sensor control according to the invention.

As shown in FIG. 2, the moisture sensing unit 25 of assembly 10 is powered through and controlled by an electronic control 26 connected to ignition 28 of the vehicle for indicating the presence of moisture to an interface circuit 48 which controls a wiper motor or motors 30 in a windshield wiper system in the vehicle. When ignition 28 is switched on, DC power is supplied from a power circuit 32 to a control circuit 34 which, in turn, activates a pair of driver circuits 36, 38. Each driver circuit 36, 38, in turn, activates a plurality of infrared energy emitting diodes 39 contained in separate emitter diode rows or arrays 40, 42. The diodes in arrays 40, 42 emit pulses of infrared energy which are detected after reflection and refraction at the windshield by separate detectors 44, 46, including photovoltaic sensor cells in rows or arrays 43, 45 (FIGS. 3 and 4). Control 34 includes synchronizing circuitry such that the moisture sensor including driver 36, emitter array 40 and detector 44 is operated alternately with the moisture sensor including driver 38, emitter array 42 and detector 46. Each detector is inhibited, or disabled, while the emitter array associated with the other moisture sensor is operated. Hence, stray, interfering infrared energy from one moisture sensor will not be picked up by the other moisture sensor, thereby avoiding inaccurate signals from detectors 44, 46. More specifically, the control enables detectors 44 and 46 only when their corresponding diode arrays 40, 42, respectively, are pulsed on. Signals 58, 76 from detectors 44, 46 are each a function of the moisture detected by the respective moisture sensor and are fed to control circuit 34 which determines whether moisture is present on the exterior surface 16 of windshield 12 and thus whether to instruct wiper interface circuit 48 to actuate wiper motor 30.

Referring to FIG. 3, each row or array of infrared energy emitting diodes 40, 42 are intermittently illuminated in unison by a synchronizing circuit 82 which triggers an IR LED driver circuit 36, 38 which, in turn, causes a current to flow through the respective row or array of infrared energy emitting diodes 40, 42. Synchronizing circuit 82 produces output pulses on lines 84, 86 which alternate at equally-spaced intervals in order to alternatingly actuate diode arrays 40, 42. In the illustrated embodiment, synchronizing circuit 82 produces 50 microsecond pulses on actuating lines 84, 86 at an approximately 200 Hz repetition rate.

The signal derived from each row or array of photovoltaic cells 43, 45 is converted from a current to a voltage and amplified by an amplifier 50, 68. Any DC offset on the signal as it is outputted by amplifier 50, 68 is removed by a high-pass filter 52, 70. With the DC component removed, the AC component is further amplified by an amplifier 54, 72 which provides its output to a sample and hold circuit 56, 74.

Sample and hold circuit 56, 74 receives an output signal from amplifier 54, 72 and an enabling signal on line 86, 84 from synchronizing circuit 82. Upon the receipt of an enabling pulse from circuit 82, sample and hold circuit 56, 74 samples and retains, on a line 58, 76, the value of the signal from amplifier 54, 72 until the next enabling pulse is received, which, in turn, causes the next value of the signal from amplifier 54, 72 to be retained on line 58, 76. In this manner, the moisture signal provided by sample and hold circuit 56, 74 on line 58, 76 is a DC signal having an amplitude that changes in a stepped fashion in unison with the enabling pulses from synchronizing circuit 82. The moisture signal outputted from the sample and hold circuit 56, 74 on line 58, 76 is provided to a moisture signal processing circuit 60, 78 which processes the moisture signal and produces a change of state on a line 62, 80 to indicate a detected change from a non-rain to a rain condition, or vice versa.

A master control 66 receives, as inputs, the signals on lines 62 and 80 from the moisture signal processing circuits 60 and 78, respectively. When a change of state on either line 62, 80 indicates that one of the detectors 44, 46 has detected moisture, master control 66 instructs wiper interface 48 to energize wiper motor 30. In addition, master control 66 produces a signal on a line 64, which is provided as an input to moisture signal processing circuits 60, 78 to switch the moisture signal processing circuits to a mode of operation that is appropriate for accurately processing a moisture signal during a rain condition. The details of such continuously adaptive moisture signal processing circuits and master control is set forth in detail in copending, commonly-assigned U.S. patent application Ser. No. 07/317,288, filed Feb. 28, 1989 by Kenneth L. Schierbeek, Mark L. Larson and Kenneth Schofield, entitled "CONTINUOUSLY ADAPTIVE MOISTURE SENSOR SYSTEM FOR WIPER CONTROL," the disclosure of which is hereby incorporated herein by reference. Since the details and manner of operation of such circuits and control is not necessary for a full understanding of the present invention, such description will not be included in detail herein.

Referring to FIG. 4, synchronizing circuit 82 produces a first pulsed output on line 84, which is connected to the base of a preliminary driving transistor 88 whose collector is, in turn, connected to the bases of transistors 89, 90, which form LED driver circuit 38. Each transistor 89, 90 is connected in common emitter configuration with a series circuit, each series circuit consisting of two of the diodes making up emitter diode array 42. In this configuration, all the diodes in array 42 are illuminated in unison in response to a negative tending pulse on line 84. Synchronizing circuit 82 produces a second pulsed output on line 86, which is connected to the base of a preliminary driving transistor 90 whose collector is, in turn, connected to the bases of transistors 91, 92 which form LED driver circuit 36. Each transistor 91, 92 is connected in common emitter configuration with a series circuit, each series circuit consisting of two of the diodes making up emitter diode array 40. All diodes in array 42 are illuminated in unison in response to a negative tending pulse on line 86.

The output signals produced by synchronizing circuit 82 on lines 84 and 86 are normally at a high voltage level and alternatingly switch to a low voltage level for 50 microseconds every 5 milliseconds at equally spaced-apart time intervals, such that emitter arrays 40 and 42 alternatingly intermittently operate, or "flash," at equally-spaced intervals. Voltage regulator 188 converts the vehicle's ignition voltage to regulated voltage (VCC) on line 168. Synchronizing circuit 82 is capable of operating a second pair of emitter arrays, indicated within the area segregated by the dotted line designated II, if it is desired to include a third and fourth moisture sensor in the moisture sensing assembly for a particular application. For the purpose of this description, it will be assumed that only two moisture sensors are included in moisture sensing assembly 10.

Figure 5:
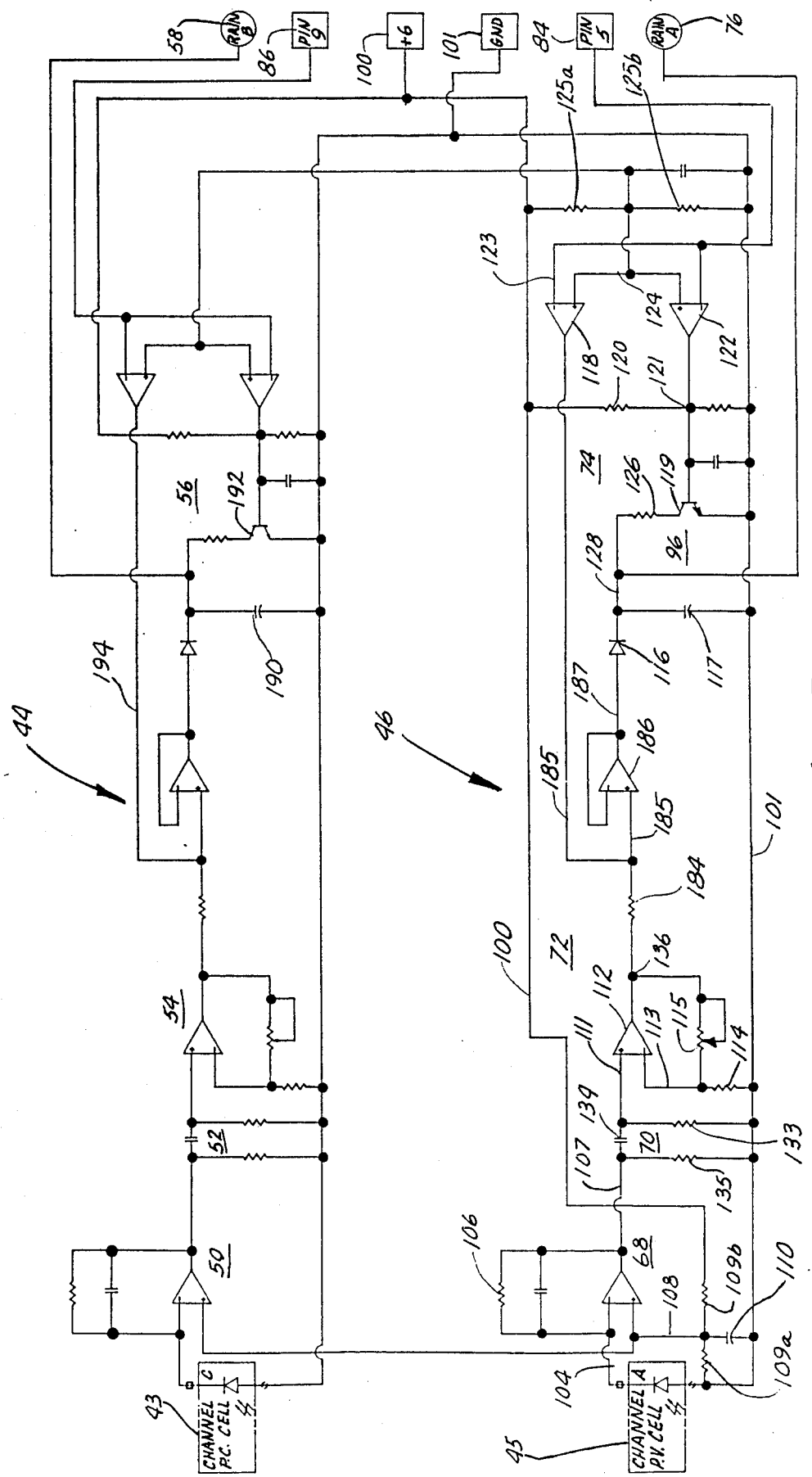
FIG. 5 is a schematic circuit diagram of the detector portion of a moisture sensor control according to the invention.

Referring to FIG. 5, the light received by photovoltaic cell array 45 from windshield 16 produces a current through a line 104 which is provided to the inverting input of an amplifier 68. A feedback resistor 106 between an output 107 of the amplifier and inverting input line 104, establishes the gain of amplifier 68 at approximately 5100 and causes the amplifier to convert the current produced from cell array 45 to a voltage on its output 107. The non-inverting input 108 to amplifier 68 is biased by a pair of resistors 109a and 109b connected respectively to signal ground 101 and to VCC 100. A capacitor 110 between input 108 and signal ground provides noise immunity.

Output 107 is connected through filter 70 to amplifier 72. Filter 70, which includes a capacitor 134 and a pair of resistors 133, 135 in a pi-configuration, is provided to remove any DC offset of output 107 so that only AC signals are presented to amplifier 72 in order to remove the effects caused by background ambient light. Capacitor 134 is connected with the non-inverting input 111 of an operational amplifier 112 whose inverting input 113 is connected to signal ground 101 through a resistor 114. A gain calibration feedback resistor 115 is connected between output line 136 of amplifier 112 and inverting input 113 and provides means to establish the gain of amplifier 72, and is nominally adjusted to a gain of 30. Line 136 is connected through a resistor 184 to the non-inverting input 185 of an operational amplifier 186. An output line 187 of amplifier 186 is connected to its inverting input, in order to configure the amplifier as a voltage-follower or buffer amplifier. Line 187 is additionally connected to sample and hold circuit 74.

Sample and hold circuit 74 includes a forwardly-poled diode 116, extending from line 187 to a line 128, and a switching means 96, including a resistor 126 in series with a transistor 119 connected in common emitter configuration, between line 128 and signal ground. Sample and hold circuit 74 further includes a capacitor 117, having a nominal value of 1 uF, connected in parallel with switching means 96 between line 128 and signal ground. The base 121 of transistor 119 is connected through a resistor 120 to VCC and to the output of a comparator 122. The output of comparator 122 is configured as an open collector transistor (not shown) that will cause current to flow to the base of transistor 119 only when the non-inverting input 124 of the comparator exceeds its inverting input 123. Non-inverting input 124 is maintained at a constant voltage by connection with the junction of a series combination of resistors 125a and 125b connected between VCC and signal ground. A companion comparator 118 has its inputs connected the same as those of comparator 122 and its open collector output connected with line 185 extending to the non-inverting input of amplifier 186. Inverting inputs 123 of comparators 122 and 118 are connected to actuating line 84, which extends from synchronizing circuit 82.

The output of photovoltaic cell array 45, which is converted to a voltage by amplifier 68, filtered at 70 and amplified by amplifier 72 charges capacitor 117, through buffer amplifier 186 and diode 116, whenever output 136 of amplifier 72 becomes more positive than the voltage on line 128 by an amount equal to the forward voltage drop of diode 116. Thus, if the amount of moisture on windshield 16 becomes less during the succeeding pulse of radiant energy from emitter array 42, output 136 will be incrementally more positive than during the previous pulse of radiant energy. This positive increment will be transferred through buffer amplifier 186 and forwardly-biased diode 116 to increase the voltage across capacitor 117.

If, however, the amount of moisture increases on the windshield 16, the next succeeding pulse of radiant energy will cause the output of amplifier 72 on line 136 to incrementally decrease. Because the voltage on line 136 would then be less than the voltage on line 128, diode 116 would be reverse-biased. In order to allow the signal on line 128 to decrease to the level on line 136, less one diode junction drop, comparator 122 responds to the negative tending pulse on line 84 from synchronizing circuit 82, which correspond to the illumination of emitter diode array 42, by causing its output transistor (not shown) to be open-circuited and thus allowing resistor 120 to pull base 121 positive. This causes transistor 119 to conduct, which bleeds a portion of the charge of capacitor 117 to ground through resistor 126. Thus, the voltage on capacitor 117 is lowered sufficiently to allow diode 116 to be forward-biased such that line 136 can reestablish the voltage on line 128, at the then existing level on line 136, less one diode junction drop. Thus, it is seen that the voltage on line 128 and hence the moisture signal output 76 of detector 46, has a continuous DC level which incrementally increases or decreases in unison with changes in the signal on line 136 that is the amplified output of the photoreceptor cell array 45 when emitter diode array 42 is actuated. The moisture signal on output 76 is thus representative of the amount of moisture on windshield 16.

During illumination of emitter diode array 42, the negative tending pulse on line 84 will also cause the output of comparator 118 to follow the voltage on line 136. This allows the voltage on line 136 to influence the voltage across capacitor 117 as previously described. In such state, the detector 46 is said to be enabled. When, however, emitter diode array 42 is not illuminated, the high voltage level provided to input 123 from line 84 causes the output transistor of comparator 118 to conduct, which clamps line 185 essentially to signal ground potential. With line 185 clamped to ground, the voltage on line 136 is isolated from sample and hold circuit 74 and is not able to influence the value of the moisture signal on line 128 and hence on output line 76. In this state, detector 46 is said to be inhibited or disabled.

Detector 44 is essentially identical with detector 46. Its photoreceptor cell array 43 is provided to receive radiant energy from window 16 that is generated by emitter diode array 40. However, due to its proximity to emitter diode array 42, a strong first-surface reflected radiant energy signal is received from array 42. During the illumination of emitter diode array 40, the negative tending pulse on line 86 will effect the operation of sample and hold circuit 56 by allowing the output of amplifier 54 to establish the voltage across a capacitor 190 by driving a transistor 192 to bleed a portion of the charge on capacitor 190. The moisture signal developed by detector 44 is provided at its output 58. When emitter diode array 40 is not illuminated, the high voltage level on line 86 will isolate the output of amplifier 54 from sample and hold circuit 56 by causing a line 194 to be clamped to ground. This prevents the radiant energy emitted by diode array 42 from falsely affecting the charge on capacitor 190.

Figure 7:
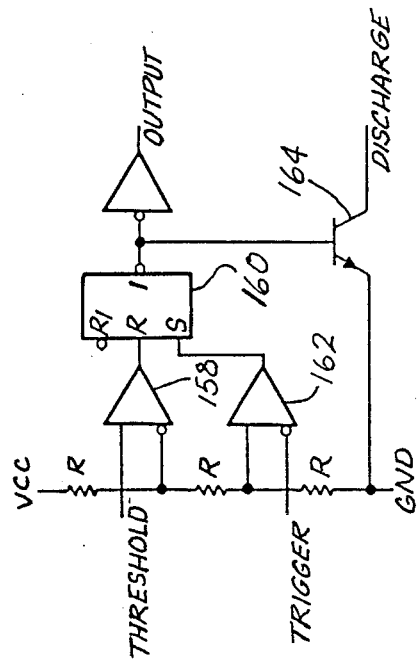
FIG. 7 is a block diagram of a timing circuit used in each oscillator circuit.

Referring again to FIG. 4, synchronizing circuit 82 includes a pair of astable oscillator circuits 140, 148 interconnected in a manner to be set forth below. In the illustrated embodiment, first and second oscillator circuits 140, 148 are embodied in a commercially available dual precision timer circuit 156 having model number NE556 and sold by numerous manufacturers, such as Texas Instruments, Incorporated. First oscillator circuit 140 includes a threshold input 142 ($Thrhd_1$) and a trigger input 144 ($Trig_1$). First oscillator circuit 140 additionally includes a discharge output 146 ($Disch_1$) and a pulsed output line 84 ($Out_1$). Second oscillator circuit 148 includes a threshold input 150 ($Thrhd_2$) and trigger input 152 ($Trig_2$). Second oscillator circuit 148 additionally includes a discharge output 154 (Disch$_2$) and a pulsed output line 86 (Out$_2$). The relevant block diagram for each oscillator portion of integrated circuit 156 is illustrated in FIG. 7 and includes a first comparator circuit 158 connected with the reset input of a latch 160 and a second comparator circuit 162 connected with the set input of latch 160. The output of latch 160 is inverted and connected with the pulsed output line and is additionally connected with the base of a transistor 164, whose emitter is grounded and whose collector is connected with the discharge line. One input of each comparator 158, 162 is maintained at a separate fixed voltage level. The second input of comparator 158 is connected with the threshold line and the second input of comparator 162 is connected with the trigger line. The fixed voltages provided to comparators 158 and 162 are preselected such that, when the voltage on the threshold line exceeds two-thirds VCC, the output of comparator 158 resets latch 160 and provides a drive current to the base of transistor 164. When the voltage on trigger input decreases to one-third VCC, the output of comparator 162 sets latch 160 to remove the drive current from the base of transistor 164. The setting and resetting of latch 160 produces a pulsed output from the circuit.

Referring again to FIG. 4, oscillator circuit 140 additionally includes a timing capacitor 166 connected between VCC line 168 and signal ground 167 through series resistors 169 and 171. With this arrangement, capacitor 166 is charged from VCC through resistors 169 and 171. Discharge output 146 is connected to the junction 179 between resistors 169 and 171 and threshold input 142 is connected to the junction 180 between resistor 171 and capacitor 166 through a resistor 172. Trigger input 144 is connected directly to junction 180. In a like manner, oscillator circuit 148 includes a timing capacitor 173 which is charged through series resistors 174, 175 connected between VCC and signal ground. In addition, discharge output 154 is connected to the junction 176 between resistors 174 and 175. Trigger input 152 is connected with the junction 177 between resistor 175 and capacitor 173 and threshold input 150 is connected through a resistor 178 to junction 177.

A first diode 181 is connected with its cathode to junction 179 and its anode to threshold input 150 to provide a conductance path between the discharge output of the first oscillator 140 and the threshold input of the second oscillator 148. Likewise, a diode 182 is connected with its cathode to junction 176 and anode to threshold input 142 to provide a conductance path between the discharge output of the second oscillator and the threshold input of the first oscillator 140. The ratio of resistors 172 to 171 and 178 to 175 is approximately 3:1. In the illustrated embodiment, the values are as follows:

| 171 | 680 ohms |
|---|---|
| 172 | 1.8K ohms |
| 175 | 680 ohms |
| 178 | 1.8K ohms |

Figure 6:
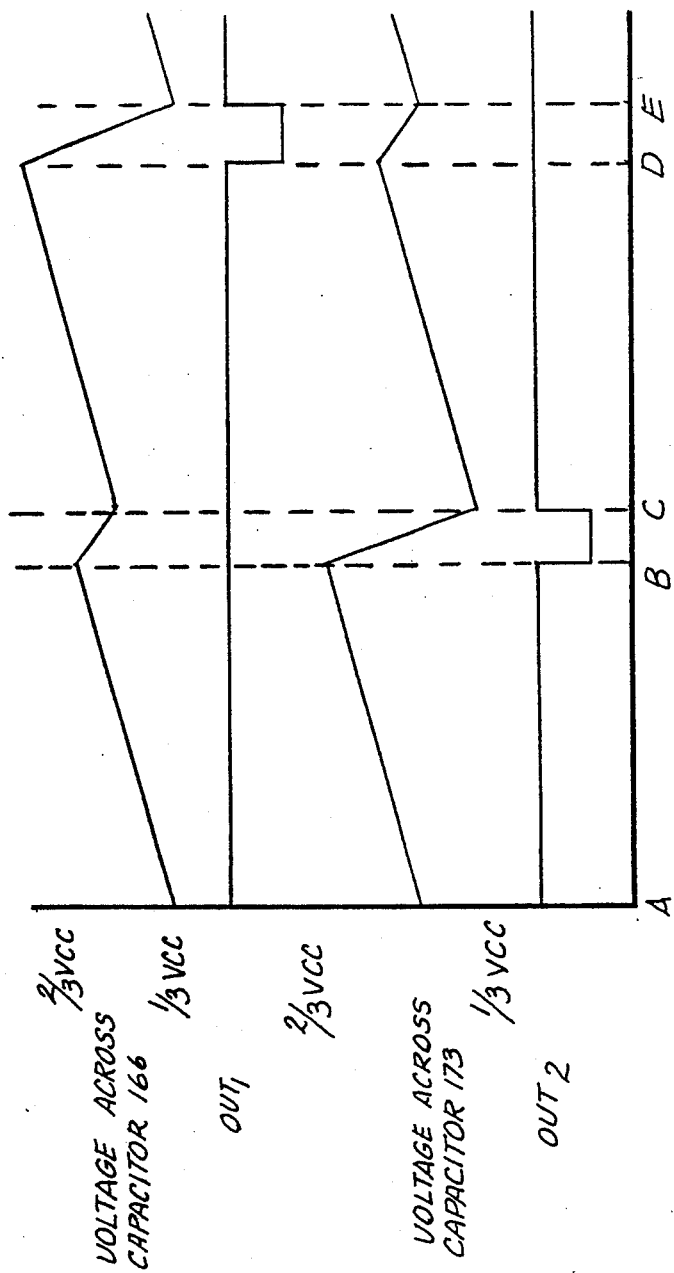
FIG. 6 is a graphic diagram illustrating the charging voltages and output voltages of the two oscillator circuits making up the synchronizing circuit.

Operation of synchronizing circuit 82 may be understood by reference to FIG. 6 in which the voltage signal across capacitors 166 and 173 and the pulsed output on lines 84 and 86 are illustrated in a steady-state condition. During the period A-B, discharge outputs 146, 154 are open-circuited and capacitors 166 and 173 are charged from VCC through resistors 169, 171 and 174, 175, respectively. At time B, the voltage on capacitor 173 reaches two-thirds VCC, as sensed by Thrhd$_2$ which causes discharge line 154 to switch to ground. This results, during the interval B-C, in capacitor 173 discharging through resistor 175 to ground. The discharging terminates when the voltage across capacitor 173 decreases to one-third VCC as sensed by Trig$_2$. During interval B-C, capacitor 166 will also be discharged but at a slower rate than capacitor 173, through a path established through resistor 172 and diode 182 which will be forward-biased, to Disch$_2$. At point C, the charge on capacitor 166 will be greater than that on capacitor 173 because capacitor 166 was only partially discharged. At point C, Disch$_2$ again becomes open-circuited, in response to the sensing at Trig$_2$ of the decrease in voltage across capacitor 173 to one-third Vcc.

During intervals C-D capacitors 166 and 173 are again charged through resistors 169, 171 and 174, 175, respectively. Because capacitor 173 was more deeply discharged than capacitor 166, Thrhd$_1$ will sense two-thirds VCC at point D while the voltage sensed by Thrhd$_2$ will be less than that amount. At point D, Disch$_1$ line switches to ground, discharging capacitor 166 through resistor 171 until its voltage decreases to one-third VCC, as determined by Trig$_1$, at which time line Disch$_1$ again becomes open-circuited. During this interval D-E, capacitor 173 is partially discharged, but at a rate slower than the discharge of capacitor 166, through a path established through resistor 178 and diode 181 to Disch$_1$.

Because synchronizing circuit 82 partially discharges the opposite capacitor while fully discharging one capacitor to 33% of VCC, the opposite capacitor will reach its threshold voltage, after discharging is terminated, sooner than the more deeply discharged capacitor. Importantly, it has been discovered that, because the charge level of the capacitor being partially discharged is a function of the time since it was previously fully discharged, and because the time until a charging capacitor reaches the threshold level is a function of its charge level when charging begins, the output pulses from the oscillator circuits are self-regulating in regard to their spacing in time. This provides the even spacing of the pulses between oscillator circuits. In addition, the pathway established through diodes 181 and 182 clamps threshold input Thrhd$_2$ to one diode-drop above ground while Disch$_1$ is discharging capacitor 166 and likewise clamps threshold input Thrhd$_1$ to one diode-drop above ground while Disch$_2$ is discharged to capacitor 173. Thus, the producing of a negative-going pulse on the output line of one oscillator will inhibit the production of a negative-going output pulse on the other oscillator to further ensure that emitter diode arrays 40 and 42 will not operate simultaneously.

Although the invention was illustrated in an optical sensor and for use in controlling the windshield wiper of a vehicle, it may find application in other sensors and for use in other applications. For example, it may be applied to other portions of a vehicle such as the rear window, for controlling a wiper, or a headlamp for controlling a washer system. Other changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A moisture sensing control for use with a window to detect and indicate the presence of moisture on a surface of said window, said control comprising:

first moisture sensing means for sensing the presence of moisture on said window, said first moisture sensing means including means for producing a first moisture signal that is a function of the moisture and means for processing said first moisture signal to provide a first indication when moisture is present;

second moisture sensing means for sensing the presence of moisture on said window, said second moisture sensing means including means for producing a second moisture signal that is a function of the moisture and means for processing said second moisture signal to produce a second indication when moisture is present; and inhibiting means for inhibiting one of said first and second moisture sensing means from processing a moisture signal when the other one of said first and second moisture sensing means is producing its associated moisture signal.

2. The control in claim 1 in which each of said moisture sensing means includes emitter means for intermittently emitting a signal in a manner that said signal is modified in response to the presence of moisture on said window to produce the associated moisture signal and detecting means for detecting and processing said moisture signal to provide the associated indication.

3. The control in claim 2 further including mounting means for mounting said first and second emitter means and said first and second detecting means in proximity to the surface of said window in a manner that the path followed by the signal emitted by said first emitter means intersects the path followed by the signal emitted by said second emitter means.

4. The control in claim 2 in which said inhibiting means includes means responsive to said first and second emitter means for inhibiting said first detecting means from processing said signal except when said first emitter means is emitting said signal and for inhibiting said second detecting means from processing said signal except when said second emitter means is emitting said signal.

5. The control in claim 2 further including synchronizing means for alternately causing said first and second emitter means to emit said signal.

6. The control in claim 5 in which said synchronizing means includes oscillator means for producing a first actuating signal adapted to actuating said first emitter means and a second actuating signal adapted to actuating said second emitter means such that said first and second actuating signals actuate said first and second emitter means at substantially equally spaced time intervals.

7. A moisture sensing control for use with a window to detect and indicate the presence of moisture on a surface of said window, said control comprising:

first moisture sensing means responsive to the presence of moisture on said window for producing a first moisture signal, said first moisture sensing means including first emitter means for emitting radiant energy toward the window and first detector means for detecting and processing the radiant energy from said first emitter means;

second moisture sensing means responsive to the presence of moisture on said window for producing a second moisture signal, said second moisture sensing means including second emitter means for emitting radiant energy toward the window and second detector means for detecting and processing the radiant energy from said second emitter means; and circuit means for controlling said first and second moisture sensing means and for producing an output signal that is a function of moisture on said window, said circuit means including actuating means for intermittently actuating said first and second emitter means in a manner that said first and second emitter means individually emit said radiant energy;

said circuit means further including inhibiting means for inhibiting the operation of said first detector means when said actuating means is actuating said second emitter means and for inhibiting the operation of said second detector means when said actuating means is actuating said first emitter means.

8. The control in claim 7 in which said actuating means actuates said first and second emitter means in a manner that said first and second emitter means alternately emit said radiant energy at equally spaced time intervals.

9. The control in claim 8 in which said inhibiting means inhibits the operation of said first detector means except when said actuating means is actuating said first emitter means and said inhibiting means inhibits the operation of said second detector means except when said actuating means is actuating said second emitter means.

10. The control in claim 7 in which said inhibiting means inhibits the operation of said first detector means except when said actuating means is actuating said first emitter means and said inhibiting means inhibits the operation of said second detector means except when said actuating means is actuating said second emitter means.

11. The control in claim 7 further including mounting means for mounting said first and second emitter means and said first and second detecting means in proximity to the surface of said window in a manner that the path followed by the radiant energy emitted by said first emitter means intersects the path followed by the radiant energy emitted by said second emitter means.

12. A moisture sensing control for use with a window to detect and indicate the presence of moisture on a surface of said window, said control comprising:

emitter means for intermittently emitting a signal in a manner that said signal is modified in response to moisture on said window;

circuit means for periodically actuating said emitter means to emit said signal for a predetermined duration of time;

detecting means for detecting and processing said signal to produce a moisture signal that is a function of said signal; and inhibiting means responsive to said circuit means for inhibiting said detecting means from detecting and processing said signal except during said duration when said emitter means is actuated by said circuit means to emit said signal.

13. The control in claim 12 in which said detecting means includes sampling means for sampling said signal and means responsive to each sampled value of said signal for retaining said value until the next said value is obtained.

14. The control in claim 13 in which said inhibiting means includes means for isolating said sampling means from said signal such that said sampling means is unable to sample said signal.

15. The control in claim 13 in which said retaining means includes a capacitor and said sampling means includes means for applying increasing values of said signal to said capacitor and discharging means responsive to said emitter means for removing charge from said capacitor when said emitter means is emitting said signal.

16. The control in claim 15 in which said inhibiting means includes means for isolating said sampling means from said signal such that said sampling means is unable to sample said signal.

17. The control in claim 12 in which said emitter means includes signal generating means and oscillator means, said oscillator means produces an intermittent actuating signal adapted to actuating said signal generating means, and said inhibiting means is responsive to said actuating signal.

18. The control in claim 17 in which said signal generating means includes infrared light generating means and driving means, said drive means responsive to said actuating signal for causing said infrared light generating means to generate infrared light.

19. A moisture sensing control for use with a window to detect and indicate the presence of moisture on a surface of said window, said control comprising:
first emitter means for intermittently emitting a first signal in a manner that first signal is modified in response to the presence of on said window;
first detecting means for detecting and processing said first signal and to produce a first moisture signal that is a function of said first signal;
first inhibiting means responsive to said first emitter means for inhibiting said first detecting means from processing said first signal except when said first emitter means is emitting said first signal;
second emitter means for emitting a second signal in a manner that said second signal is modified in response to the presence of moisture on said window;
second detecting means for detecting and processing said second signal and to produce a second moisture signal that is a function of said second signal;
second inhibiting means responsive to said second emitter means for inhibiting said second detecting means from processing said second signal except when said second emitter means is emitting said second signal;
circuit means responsive to said first and second moisture signals for producing an output signal; and
synchronizing means for causing said first and second emitter means to alternately and individually emit said first and second signals.

20. The control in claim 19 further including mounting means for mounting said first and second emitter means and said first and second detecting means in proximity to the surface of said window in a manner that the path followed by the first signal emitted by said first, emitter means intersects the path followed by the second signal emitted by said second emitter means.

21. The control in claim 19 in which said synchronizing means includes oscillator means for producing a first actuating signal adapted to actuating said first emitter means and a second actuating signal adapted to actuating said second emitter means such that said first and second actuating signals actuate said first and second emitter means at substantially equally spaced time intervals.

22. The control in claim 21 in which said first inhibiting means is responsive to said first actuating signal and said second inhibiting means is responsive to said second actuating signal.

23. The control in claim 19 in which each of said detecting means includes sampling means for sampling said signal and means responsive to each sampled value of said signal for retaining said value until the next value is obtained.

24. The control in claim 23 in which each of said inhibiting means includes means for isolating said sampling means from said signal such that said sampling means is unable to sample said signal.

25. A moisture sensing control for use with a window to detect and indicate the presence of moisture on a surface of said window, said control comprising:
first emitter means for emitting a first signal in a manner that said first signal is modified in response to the presence of moisture on said window;
second emitter means for emitting a second signal in a manner that said second signal is modified in response to the presence of moisture on said window;
means responsive to said first and second signals for indicating the presence of moisture;
synchronizing means for alternately causing said first and second emitter means to emit a signal, said synchronizing means including
first oscillator means for intermittently causing one of said first and second emitter means to emit a signal and having a first capacitor, means for charging said first capacitor, first sensing means for sensing the charge on said first capacitor and first discharging means responsive to said first sensing means for discharging said first capacitor when the charge thereon increases to a first predetermined level;
second oscillator means for intermittently causing the other of said first and second emitter means to emit a signal and having a second capacitor, means for charging said second capacitor, second sensing means for sensing the charge on said second capacitor and second discharging means responsive to said second sensing means for discharging said second capacitor when the charge thereon increases to a second predetermined level;
first coupling means responsive to said first discharging means for partially discharging said second capacitor; and
second coupling means responsive to said second discharging means for partially discharging said first capacitor.

26. The control in claim 25 in which said first coupling means further includes means responsive to said first discharging means discharging said first capacitor for disabling said second sensing means and in which said second coupling means further includes means responsive to said second discharging means discharging said second capacitor for disabling said first sensing means.

27. The control in claim 25 in which said first coupling means includes means for discharging said second capacitor at a rate that is slower than said first discharging means discharges said first capacitor.

28. The control in claim 27 in which said second coupling means includes means for discharging said first capacitor at a rate that is slower than said second discharging means discharges said second capacitor.

29. The control in claim 28 in which said first oscillator means further includes a third sensing means for sensing the charge on said first capacitor and wherein said first discharging means is responsive to said third sensing means to terminate said discharging of said first capacitor when the charge therein decreases to a third predetermined level.

30. The control in claim 25 in which said first oscillator means further includes a third sensing means for sensing the charge on said first capacitor and wherein said first discharging means is responsive to said third sensing means to terminate said discharging of said first capacitor when the charge therein decreases to a third predetermined level.

31. The control in claim 29 in which said second oscillator means further includes a fourth sensing means for sensing the charge on said second capacitor and wherein said second discharging means is responsive to said fourth sensing means to terminate said discharging of said second capacitor when the charge thereon decreases to a fourth predetermined level.

32. The control in claim 30 in which said second oscillator means further includes a fourth sensing means for sensing the charge on said second capacitor and wherein said second discharging means is responsive to said fourth sensing means to terminate said discharging of said second capacitor when the charge thereon decreases to a fourth predetermined level.

33. The control in claim 25 in which said first coupling means includes a first conducting device connecting said first discharging means with said second capacitor and said second coupling means includes a second conducting device connecting said second discharging means with said first capacitor.

34. The control in claim 33 in which said first conducting device additionally connects said first discharging means with said second sensing means such that said first coupling means additionally disables said second sensing means when said first discharging means is discharging said first capacitor and in which said second conducting device additionally connects said second discharging means with said first sensing means such that said second coupling means additionally disables said first sensing means when said second discharging means is discharging said second capacitor.

35. The control in claim 33 in which each of said first and second conducting devices is a diode.

* * * * *

UNITED STATES PATENT AND TRADEMARK OFFICE
CERTIFICATE OF CORRECTION

PATENT NO. : 4,956,591
DATED : September 11, 1990
INVENTOR(S) : Kenneth L. Schierbeek et al.

It is certified that error appears in the above-identified patent and that said Letters Patent is hereby corrected as shown below:

Column 3, line 68:

After "drawings" insert --.--

Column 4, line 39:

After "16" insert --.--

Column 13, line 33, claim 19:

After "that" insert --said--

Column 13, line 34, claim 19:

After "of" insert --moisture--

Signed and Sealed this

Twenty-first Day of April, 1992

Attest:

HARRY F. MANBECK, JR.

*Attesting Officer*      *Commissioner of Patents and Trademarks*